United States Patent [19]
Weng

[11] Patent Number: 5,201,797
[45] Date of Patent: Apr. 13, 1993

[54] INDUCTION HEATER HAVING CYLINDRICAL COOKING RECEPTACLE

[76] Inventor: Shun-Te Weng, No. 9, Yung Kuang Lane, Herming Village, Show Shui Hsiang, Chang Hwa Hsien, Taiwan

[21] Appl. No.: 786,165

[22] Filed: Oct. 31, 1991

[51] Int. Cl.⁵ .............................................. A23L 3/10
[52] U.S. Cl. .................................... 99/359; 126/367; 99/325
[58] Field of Search ................ 99/359, 467, 367, 325, 99/249; 126/369

[56] References Cited

U.S. PATENT DOCUMENTS

| | | | |
|---|---|---|---|
| 2,182,383 | 12/1939 | Lang et al. | 99/359 |
| 2,505,092 | 4/1950 | Brewer | 99/359 |
| 2,785,275 | 3/1957 | Verble | 99/359 X |
| 3,284,613 | 11/1966 | Gettelman et al. | 99/359 |
| 4,109,566 | 8/1978 | Vigerstrom | 99/359 |
| 4,739,699 | 4/1988 | Nelson | 99/359 X |

*Primary Examiner*—Frankie L. Stinson
*Attorney, Agent, or Firm*—Browdy and Neimark

[57] ABSTRACT

An induction heater having cylindrical cooking receptacle comprises a housing provided therein with an electromagnetic circuit of heating, a heat radiating fan, and at least an induction coil. The housing is further composed of a cylindrical receptacle encased by a cylindrical induction coil controlled by the electromagnetic circuit for heating so as to induce the generation of eddy current in the conducting material making up the container placed in the cylindrical receptacle in order that the food contained in the container is heated efficiently and rapidly.

1 Claim, 2 Drawing Sheets

INDUCTION HEATER HAVING CYLINDRICAL COOKING RECEPTACLE

BACKGROUND OF THE INVENTION

The present invention relates to an induction heater, and more particularly to an induction heater having a cylindrical cooking receptacle.

It is a common practice that a person wishing to warm canned food by means of a conventional induction heater of the prior art must first remove the canned food into a cookware, which is then placed on the flat cook plate of the induction heater. Of course, the canned food can be warmed up by lacing the can containing the food directly on the flat cook plate of an induction heater of the prior art. However, such method of warming up the canned food is an inefficient and time-consuming one, because of the fact that only the bottom of the can is heated directly and the area of the heated bottom of the can is usually quite small. Therefore, certain can manufacturers have introduced a can which is provided at the bottom thereof with a heat generation material to speed up the warming process of canned food. Needless to say, the cost of making such a can is expensive. Accordingly, the introduction of such a specialized can has never been well received by manufacturers, food processors, and consumers.

SUMMARY OF THE INVENTION

It is therefore the primary objective of the present invention to provide an induction heat with a cylindrical cooking receptacle, which permits the can containing the food to be placed therein for a fast and efficient warm-up, without having to remove the canned food into a cookware.

It is another objective of the present invention to provide an induction heater with a cylindrical cooking receptacle capable of inducing the entire metal can placed thereinto to generate heat to warm up quickly and efficiently the food contained in the metal can.

It is still another objective of the present invention to provide an induction heater with a cylindrical cooking receptacle, which is small in size, light in weight, and easy and safe to use.

In keeping with the principles of the present invention, the objectives of the present invention are accomplished by an induction heater which is provided with a cylindrical cooking receptacle, an electromagnetic heating circuit, a heat radiating fan, and at least an electromagnetic induction coil. The induction heater of the present invention is characterized in that it comprises therein at least one cylindrical cooking receptacle encircled by the cylindrical induction coil in a spiral manner so that the induction coil reaches an appropriate height and diameter so as to permit a can or a similar container of cylindrical construction to be placed therein. The heating of the can placed in the cylindrical cooking receptacle of the induction heater of the present invention is brought about by means of electric eddy current induced by an alternating magnetic filed of the induction coil encircling the cylindrical cooking receptacle and the food contained in the can is heated quickly and efficiently.

The induction heater of the present invention is further characterized in that it can be provided with a plurality of cylindrical induction coils to permit a plurality of cans to be heated simultaneously.

The structures, functions, and features of the present invention will be better understood by studying the following detailed description of the preferred embodiments, in conjunction with the drawings provided herewith.

DETAILED DESCRIPTION OF THE PREFERRED EMBODIMENTS

Figure 1:
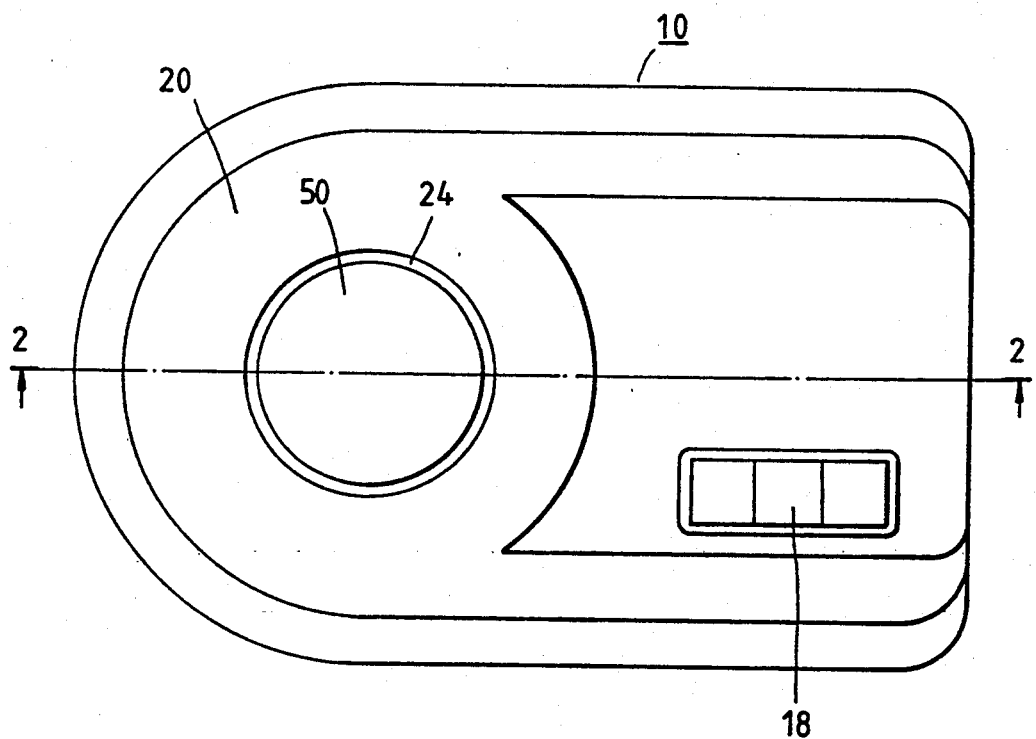
FIG. 1 shows a top view of the induction heater having a cylindrical cooking receptacle according to the present invention.
Figure 2:
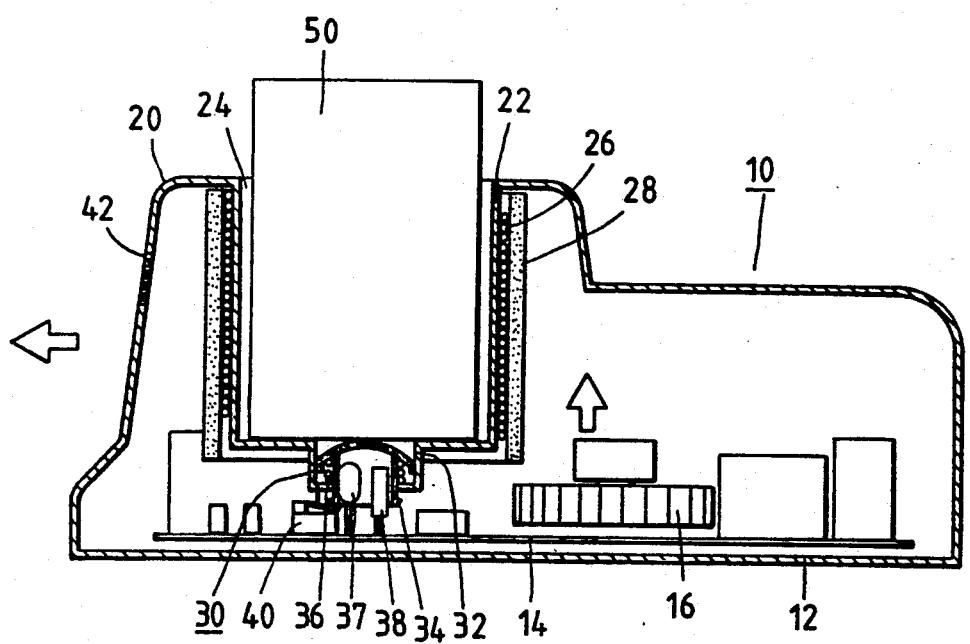
FIG. 2 shows a sectional schematic view of the portion taken along the line 2—2 as shown in FIG. 1.

Referring to FIGS. 1 and 2, the induction heater of the present invention is comprising a housing 10 of hollow construction. The bottom plate 12 of the housing 10 comprises thereon a circuit board 14 and a heat radiating fan 16. Located at the top of the housing 10 is an on-off switch 18. The receiving portion 20 is disposed at an appropriate position in the upper portion of the housing 10. The receiving portion 20 is composed of a recessed cylindrical portion 22 containing therein a cylindrical receptacle 24 encircled spirally by a cylindrical induction coil 26 and cemented firmly to the cylindrical portion 22. The cylindrical induction coil 26 is encased by an iron cylinder 28. In other words, the cylindrical portion 22, the cylindrical induction coil 26, and the iron cylinder 28 are fitted together concentrically.

Located under the cylindrical portion 22 is a recessed portion 30 containing therein a movable piece 32 capable of moving upwardly and downwardly. The movable piece 32 comprises at the bottom thereof a hook 34 encased by a spring 36 and is further provided therein with a temperature-sensing resistance 37 ad a temperature fuse 38. A micro-switch 40 is disposed on the circuit board 14 just beneath the movable piece 32 so that the power supply can be triggered when the movable piece 32 is pressed down by the weight of a can. The receiving portion 20 further comprises a plurality of heat radiating holes 42 arranged circularly.

In using the induction heater of the present invention, the can 50 should be opened before being placed in the cylindrical receptacle 24. The weight of the food contained in the can 50 forces the movable piece 32 to exert pressure on the spring 36, which moves downwardly to trigger the micro-switch 40. As a result, the circuit on the circuit board 14 is activated electromagnetically so that the induction coil generates an alternating magnetic filed which induces the metal can, such as a tin can, to generate an eddy current for heating the food contained in the can. The induction coil 26 is protected and surrounded by the iron cylinder 28, which serves to prevent the alternating magnetic field generated by the induction coil 26 from expading outwardly so as to ensure that heating of the can takes place efficiently and rapidly. As soon as the can 50 has been heated to an intended temperature, the temperature-sensing resistance 37 is triggered to interrupt automatically the current conduction of the circuit so as to bring about an immediate termination of the heating of the can 50. The temperature fuse 38 is used as a standby temperature-sensing means and is capable of acting to terminate the power supply in case overheating of the can 50 takes place. Therefore, the induction heater of the present invention is completely safe to use.

Figure 3:
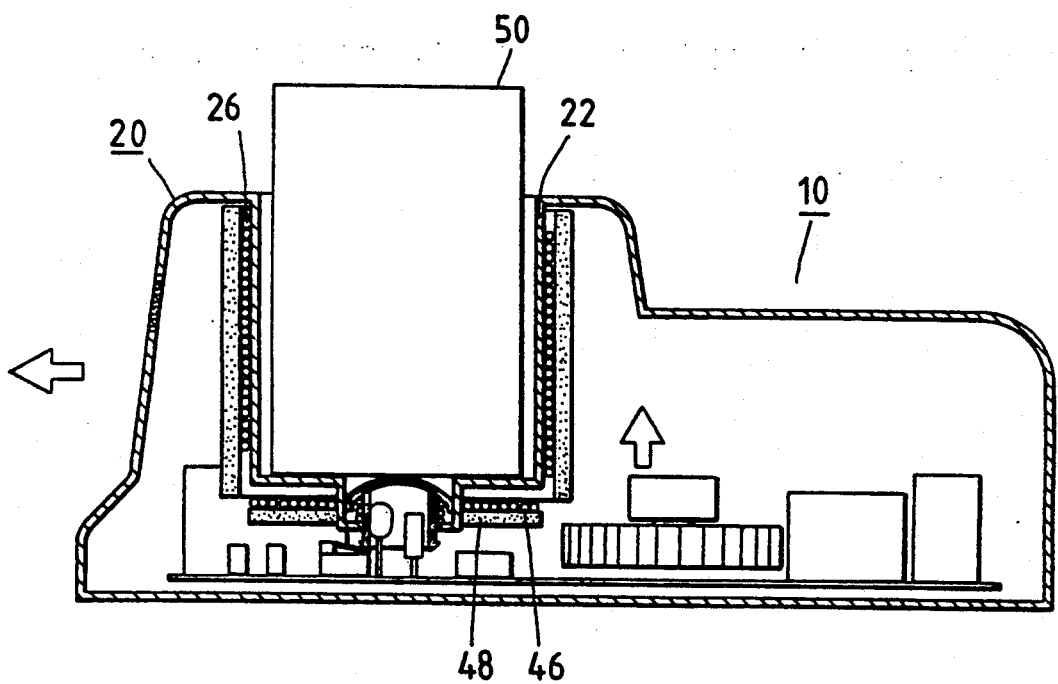
FIG. 3 shows a sectional schematic view of another preferred embodiment of the present invention.

As shown in FIG. 3, another preferred embodiment of the present invention is structurally similar to the first preferred embodiment described above, with the only difference being that the former is additionally provided with a disk induction coil 5 and a disk iron plate 48, which are disposed under the recessed cylindrical portion 22. The disk induction coil 46 is capable of working synchronously with the cylindrical induction coil 26 so that the bottom of the can 50 can also be directly heated to speed up the heating of the food contained in the can 50.

The embodiments of the present invention described above is to be considered in all respects as merely illustrative and not restrictive. Accordingly, the present invention may be embodied in other specific forms without deviating from the spirit thereof. For example, the recessed cylindrical portion 22 may be provided with a plurality of cylindrical induction coils so as to heat simultaneously a plurality of cans. Furthermore, the shape of the induction coil may be something other than cylindrical in order to facilitate the heating of a container which is not cylindrical in shape. In addition, the micro-switch 40, which is designed to be triggered by the movable piece 32, can be removed and replaced by an induction coil provided with a sensing means enabling it to be activated by the placement of a can into the cooking receptacle of the induction heater. As a result, the recessed portion 30 can be eliminated. The present invention is therefore to be limited only by the scope of the hereinafter appended claims.

I claim:

1. An induction heater having a cylindrical cooking receptacle comprising:

a housing provided with an electromagnetic circuit;

an electromagnetic induction coil for heating;

a housing composed of at least a cylindrical portion having therein a cylindrical receptacle encased by said electromagnetic cylindrical induction coil controlled by said electromagnetic circuit to induce electric current in a conducting material of a container placed in said cylindrical receptacle so that food contained in said container is heated;

said cylindrical induction coil being encased by an iron cylinder disposed concentrically along with said cylindrical portion and said cylindrical induction coil, and wherein said housing comprises a plurality of heat radiating holes arranged circularly; and wherein said cylindrical portion contains thereunder a recessed portion comprising therein a movable piece capable of moving upwardly and downwardly by means of a biasing means and having therein at least a temperature-sensing resistance and a temperature fuse.

* * * * *